United States Patent
Li et al.

(10) Patent No.: US 10,102,386 B2
(45) Date of Patent: *Oct. 16, 2018

(54) DECRYPTING CONTENT PROTECTED WITH INITIALIZATION VECTOR MANIPULATION

(71) Applicant: Amazon Technologies, Inc., Seattle, WA (US)

(72) Inventors: Lei Li, Kirkland, WA (US); Pankaj Sethi, Seattle, WA (US); Patrik Schnell, Issaguah, WA (US); Wesley Shawn Davis, Seattle, WA (US); Joshua B. Barnard, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/481,587

(22) Filed: Apr. 7, 2017

(65) Prior Publication Data
US 2017/0206364 A1 Jul. 20, 2017

Related U.S. Application Data

(63) Continuation of application No. 14/311,899, filed on Jun. 23, 2014, now Pat. No. 9,665,696, and a continuation of application No. 13/604,581, filed on Sep. 5, 2012, now Pat. No. 8,769,306.

(51) Int. Cl.
*G06F 21/60* (2013.01)
*G06F 21/10* (2013.01)
*H04L 9/06* (2006.01)
*H04L 29/06* (2006.01)

(52) U.S. Cl.
CPC ............ *G06F 21/602* (2013.01); *G06F 21/10* (2013.01); *H04L 9/0631* (2013.01); *H04L 63/0428* (2013.01); *H05K 999/99* (2013.01); *G06F 2221/07* (2013.01)

(58) Field of Classification Search
CPC .. G06F 21/602; H04L 63/0428; H04L 9/0631
See application file for complete search history.

(56) References Cited

U.S. PATENT DOCUMENTS

| | | | | |
|---|---|---|---|---|
| 8,358,781 | B2 * | 1/2013 | Schneider | H04L 9/0637 380/46 |
| 9,077,521 | B2 * | 7/2015 | Machani | H04L 63/0435 |
| 2006/0210065 | A1 * | 9/2006 | Ito | H04N 21/2347 380/28 |
| 2007/0038873 | A1 * | 2/2007 | Oliveira | G06F 21/10 713/193 |
| 2008/0130872 | A1 * | 6/2008 | Bolotov | H04L 9/0637 380/28 |
| 2008/0187134 | A1 * | 8/2008 | Nourry | H04L 9/12 380/29 |

(Continued)

*Primary Examiner* — Matthew Smithers
(74) *Attorney, Agent, or Firm* — Thomas | Horstemeyer, LLP (57) ABSTRACT

Disclosed are various embodiments for generating encrypted media content items as well as decrypting encrypted media content items. A content type is embedded in an initialization vector corresponding to an encrypted sample. Upon decryption of encrypted content, the content type is identified and an action taken based upon the detected content type.

18 Claims, 6 Drawing Sheets

(56) References Cited

U.S. PATENT DOCUMENTS

| | | | |
|---|---|---|---|
| 2010/0111295 A1* | 5/2010 | Okada | H04L 9/0637 380/28 |
| 2010/0111298 A1* | 5/2010 | Krig | H04L 9/0637 380/37 |
| 2010/0185854 A1* | 7/2010 | Burns | G06F 21/10 713/165 |
| 2011/0129087 A1* | 6/2011 | Zhang | G06F 21/10 380/44 |
| 2013/0129079 A1* | 5/2013 | Swaminathan | H04L 9/0637 380/28 |

* cited by examiner

DECRYPTING CONTENT PROTECTED WITH INITIALIZATION VECTOR MANIPULATION

CROSS-REFERENCE TO RELATED APPLICATIONS

This application is a continuation of and claims the benefit of both U.S. patent application Ser. No. 14/311,899, filed Jun. 23, 2014, entitled "PROTECTING CONTENT WITH INITIALIZATION VECTOR MANIPULATION," as well as U.S. patent application Ser. No. 13/604,581, filed Sep. 5, 2012, now U.S. Pat. No. 8,769,306, entitled "PROTECTING CONTENT WITH INITIALIZATION VECTOR MANIPULATION," both of which are incorporated herein by reference in their entireties.

BACKGROUND

Media content, such as audio, video, electronic books or magazines, or any other type of content is often protected with encryption and digital rights management technology in order to limit unauthorized copying and distribution of the media content. Attackers often devise ways with which encryption systems can be bypassed or avoided to access protected media content. Content owners may often require digital rights management technology to be applied to media content as a condition of allowing digital distribution of media content. Accordingly, content owners are increasingly concerned about unauthorized access of protected media content.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Embodiments of the present disclosure are directed to protection of media content such as audio content, video content, electronic books, or any other type of content that is encrypted as a form of digital rights management technology. A media content item can include video content, audio content, electronic book content or other textual content, imagery, or any other type of content that can be packaged in a media container and transmitted to a client device for consumption.

In some devices in which media content can be consumed, certain types of content that are provided an encrypted media content items are decrypted and decoded for playback or other consumption in the device in a trusted portion of the client device. In other words, the media content, after decryption, is not delivered to userspace memory, or an untrusted memory space, at any time, even for decoding and playback. In some cases, certain types of content (e.g., audio) is decrypted in a trusted portion of the client device and the decrypted content is delivered to an untrusted memory space for decoding and playback on the device.

Accordingly, embodiments of the present disclosure can facilitate protection of media content by eliminating at least one attack vector that an attacker may employ to bypass a content protection scheme used to protect media content. As one example, decryption logic in a trusted portion of a client device may rely on a content type specified by meta data associated with a media content item to determine whether decrypted content is delivered to an untrusted memory space. Therefore, one attack vector involves modification of meta data to a content type that causes decryption logic in a client to deliver the unencrypted content to an untrusted memory space, such as userspace memory, where the unencrypted content can be accessed and potentially copied. Therefore, embodiments of the present disclosure can reduce or eliminate such an attack vector to enhance protection of encrypted media content items transmitted to a client device.

Briefly stated, embodiments of the disclosure can embed a content type associated with an encrypted media content item in an initialization vector provided with the encrypted file that is used to decrypt the encrypted media content item. In this way, modification of the content type in the initialization vector will cause decryption of the encrypted file to generate a corrupted or invalid result. Accordingly, an attacker cannot employ the attack vector described above to gain access to the decrypted content. Next, a discussion of one example environment in which embodiments of the disclosure can be implemented is described, followed by a more detailed discussion of the content protection methodologies described herein.

Figure 1:
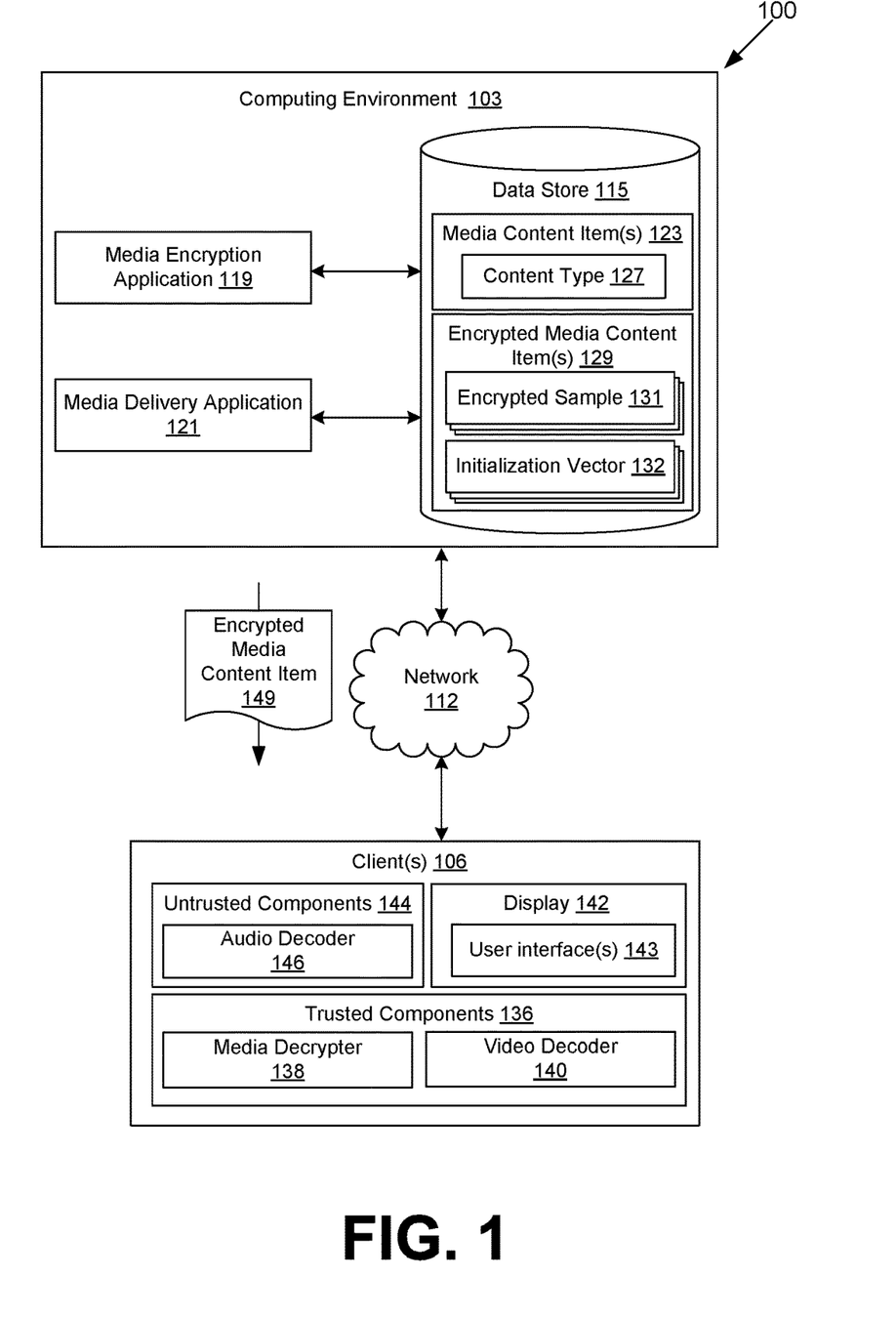
FIG. 1 is a drawing of networked environment according to various embodiments of the present disclosure.

With reference to FIG. 1, shown is a networked environment 100 according to various embodiments. The networked environment 100 may include a computing environment 103, and at least one client 106 in communication via a network 112. The network 112 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, a plurality of computing devices may be employed that are arranged, for example, in one or more server banks or computer banks or other arrangements. For example, computing environment 103 may comprise a cloud computing resource, a grid computing resource, and/or any other distributed computing arrangement. Such computing devices may be located in a single installation or may be distributed among many different geographical locations.

Various applications and/or other functionality may be executed in the computing environment 103 according to various embodiments. Also, various data is stored in a data store 115 that is accessible to the computing environment 103. The data store 115 may be representative of a plurality of data stores 115 as can be appreciated. The data stored in the data store 115, for example, is associated with the operation of the various applications and/or functional entities described below.

The components executed by the computing environment 103, for example, include a media encryption application 119, a media delivery application 121, and other applications, services and/or modules. The media delivery application 121 is executed to act as a content delivery system in order to deliver audio, video or other content that can be packaged in a media container file such as a protected interoperable file format (PIFF) specification file, an international standards organization (ISO) base media file format file, any streaming media format, an electronic book format, or any other type of format in which media content items can be packaged and delivered to a client 106 for consumption. For example, in one embodiment, the media delivery application 121 can be configured to deliver encrypted media content items 149 to a client 106 in the form of streaming video, where the video content within the encrypted media content item 149 is encrypted according to an encryption standard that involves the use of an initialization vector.

The media delivery application 121 can act as a portal through which requests are received and through which responses are sent to clients 106. In one embodiment, the media delivery application 121 can be configured to provide streaming media such as video content and/or a video stream to a special purpose application executed on a client 106 that is executed for the purposes of interaction with the media delivery application 121. It should be appreciated that the functionality of the media delivery application 121 as described herein may be implemented in multiple or various services and on multiple or various servers.

For example, in one embodiment the media delivery application 121 may generate video streams and/or network pages containing video content such as web pages or other types of network content that is provided to a client 106 to facilitate receiving and viewing multimedia content. The network pages may be static in nature, or they may be generated dynamically. Such network pages may be generated dynamically using various software platforms such as asynchronous JavaScript and XML (AJAX), JavaScript, Perl, PHP, Java, or other software platforms as can be appreciated. In addition, video content can be embedded in such network pages through the use of one or more multimedia formats such as flash video, MPEG video, streaming audio or other media formats or streaming formats as can be appreciated.

The media encryption application 119 is executed to encrypt media content items 123 according to an encryption scheme selected by an operator of the media delivery application 121, content provider, content owner, publisher, author, etc. Additionally, in some embodiments, the media encryption application 119 can package an encrypted media content item in a media container file and/or stream that can be transmitted to a client 106 for consumption. In one embodiment, the media encryption application 119 can encrypt media content items 123 by applying an advanced encryption standard (AES) encryption algorithm. For example, the media encryption application 119 can apply the AES-128 algorithm in a counter mode. In AES-128 counter mode, the initialization vector is generated and provided as an input to the AES-128 encryption process. Additionally, a counter is also generated for each encrypted sample so that the initialization vector and counter is associated with each encrypted sample of a media content item 123 encrypted by the media encryption application 119. Additional detail regarding generation of an initialization vector generated by the media encryption application 119 for encryption purposes is discussed below.

The data stored in the data store 115 includes one or more media content items 123. A media content item 123 can include various meta data, such as author information, pricing information, information about artists and/or performers associated with a particular media content item 123 and other meta data as can be appreciated. As noted above, a media content item 123 can comprise video content, audio content, electronic book content, or any other type of media for which content protection is desired. A media content item 123 can also be associated with a content type 127 that specifies a content type code or identifier associated with the media content item 123. Embodiments of the disclosure can also be applied to any other type of digital content, such as applications, email communications, or any other type of content or data to which an encryption algorithm can be applied.

The data store 115 also includes encrypted media content items 129 that are generated by the media encryption application 119 and that correspond to a media content item 123. An encrypted media content item 129 can take the form of a media container file, such as a PIFF file, that contains various encrypted samples 131 generated by the media encryption application 119. Additionally, each of the encrypted samples 131 is also associated with an initialization vector 132 that is generated by the media encryption application 119 and used to generate the encrypted samples 131 within the encrypted media content item 129. For example, an encryption algorithm can be executed in a mode in which an initialization vector is employed to randomize the encryption cipher text that is produced by the encryption algorithm. An initialization vector 132 corresponding to each encrypted sample 131 is provided with an encrypted media content item 129 so that decryption of an encrypted sample 131 can be performed using a private key in combination with the initialization vector 132.

The client 106 is representative of one or more client devices that may be coupled to the network 112. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

In one non-limiting embodiment, the client 106 may be configured to include various hardware components, some of which are secure, or trusted, components, and other of which are untrusted components. In the depicted example, the client 106 is configured with various trusted components 136 in which media content items 123 can be securely manipulated, decoded, and accessed by various trusted components 136. For example, the trusted components 136 can include a media decrypter 138 in which one or more encryption keys can be stored for the purpose of decrypting encrypted media content items 149 as well as firmware and/or software executed to perform the decryption process of an encrypted media content item 149. In some embodiments, the media decrypter 138 can comprise a hardware decrypter to which an encrypted media content item 149 can be delivered. The media decrypter 138 can apply a decryption algorithm using a private key and output unencrypted media content based upon the initialization vector associated with the encrypted media content item 149 by applying a specified decryption algorithm.

Another example of a trusted component 136 is a video decoder 140 in which video content corresponding to an encrypted media content item 149 can be decoded and rendered on a display 142 in a user interface 143. In some scenarios, a content provider may specify that certain content, such as video, should remain within a trusted component upon decryption of the content for decoding and playback purposes. In contrast, certain other content, such as audio, may be delivered to untrusted components 144, such as an audio decoder 146 executed by the client 106 to decode unencrypted audio provided by the media decrypter 138 and facilitate playback of the audio by the client 106. Accordingly, an untrusted component 144 can include, for example, userspace memory of a client 106 or any other component of the client 106 that may be insecure and/or accessible by a user or an untrusted software application executed by the client 106.

It should be appreciated that the depicted example showing the audio decoder 146 as an untrusted component 144 and the video decoder 140 as a trusted component 136 is only one example. In other embodiments, an audio decoder 146 may be a trusted component 136, while a video decoder 140 may be an untrusted component 144. Similarly, there may be other applications, software, hardware components or the like that are trusted components 136 or trusted components 136, respectively.

In the context of the present disclosure, the terms "trusted component" and "untrusted component" are merely relative terms with respect to one another and are presented in the context of a particular implementation of one embodiment of the disclosure. In other embodiments, a client 106 can be implemented with various trust zones, neither of which are trusted any more or less than another, but which merely define different zones within the client 106 in which decryption of an encrypted media content item 139 can occur and to which unencrypted content can be delivered upon decryption depending upon the content type code embedded in the initialization vector corresponding to the encrypted content. For example, a first trust zone can include a hardware decrypter in a computing system in which content is decrypted as well as a video card or trusted code executed by the computing system in which video decoding occurs if the content type specifies that the encrypted content is video content. A second trust zone can include code executed by the computing system in which decoding of audio content occurs if the content type specifies that the encrypted content is audio content. Other variations and permutations of varying trust levels or trust zones within a client 106 should be appreciated by a person of ordinary skill in the art.

Next, a general description of the operation of the media encryption application 119 is provided. To begin, the media encryption application 119, as briefly described above, can produce encrypted media content items 129 that corresponded to an unencrypted media content item 123. As also noted above, a media content item 123 can include audio content, video content, electronic book content, or any other type of content that can be packaged in any type of media container file and transmitted via the network 112 to a client 106 for consumption.

Accordingly, to generate an encrypted media content item 129, the media encryption application 119 can obtain an unencrypted media content item 123 and identify a content type 127 associated with the media content item 123. The media encryption application 119 can then generate an encrypted media content item 129 by encrypting the media content item according to an encryption scheme selected by a content provider, by an operator of the media delivery application 121, etc. In one embodiment, the encryption scheme employed by the media encryption application 119 can be AES 128 executed in counter (CTR) mode. AES 128 CTR mode involves creation of multiple encrypted samples 131 based upon an encryption key, where each encrypted sample 131 corresponds to a portion of the media content item 123. Each of the encrypted samples 131 is also associated with an initialization vector 132 that is generally unique with respect to an initialization vector 132 associated with another encrypted sample 131. Accordingly, in order to subsequently decrypt an encrypted media content item 129, a client 106 or other device, an encryption key as well as the initialization vectors 132 corresponding to each encrypted sample 131 of the encrypted media content item 129 are required.

Accordingly, it should be appreciated that an initialization vector 132 corresponding to an encrypted sample contains a cryptographic nonce that is unique with respect to other cryptographic nonces associated with other initialization vectors 132 corresponding to other encrypted samples. If an encryption scheme in a counter mode, such as AES 128 CTR mode, is employed as an encryption scheme by the media encryption application 119, the initialization vector 132 can also include a counter field. To facilitate protection of media content item 123 based upon its content type 127, a content type code is also embedded in the initialization vector 132 that is generated by the media encryption application 119 for each of the encrypted samples 131.

For example, at least one bit of the initialization vector 132 generated by the media encryption application 119 for each of the encrypted samples 131 can be reserved for a content type code. A remaining portion of the initialization vector 132 can comprise a cryptographic nonce as well as a counter field in the event that an encryption scheme is a counter mode is employed. In one embodiment, in the case of AES 128 CTR mode encryption, the two highest order bits of each initialization vector 132 corresponding to each encrypted sample 131 comprise content type code that specifies a content type 127 of the media content item 123. The next sixty-two highest ordered bits comprise a cryptographic nonce, and the final sixty-four bits comprise a counter according to the AES 128 CTR mode scheme. It should be appreciated that in this example, the content type code bits are taken from the bits ordinarily reserved for the cryptographic nonce according to other solutions that may include AES 128 CTR mode implementations, while the bits associated with the counter remain unchanged.

Accordingly, the media delivery application 121 can provide an encrypted media content item 149 to the client 106 by way of the network 112. In one embodiment, the media delivery application 121 can provide the encrypted media content item 149 as encrypted streaming media (e.g., streaming audio, video) to the client 106. As another example, the media delivery application 121 can transmit an encrypted media content item 149 in its entirety to a client 106, and the client 106 can perform decryption of the encrypted media content item 149 using an encryption key and/or content license that is accessible to the client 106.

Next, a general description of the operation of the media decrypter 138 is provided according to various embodiments of the disclosure. As noted above, the logic of the media decrypter 138 can be provided as a hardware device within a client device 106, as software executed by a processor in a client device 106, as firmware executed by a component within the client device 106, or any other implementation as can be appreciated. Additionally, the depicted arrangement of trusted components 136 and/or untrusted components 144 in the client 106 is one example shown to illustrate operation of decryption of an encrypted media content item 149 by the media decrypter 138.

Accordingly, upon receiving an encrypted media content item 149 from the media delivery application 121 that is encrypted by the media encryption application 119, the media decrypter 138, identifies a content type associated with the encrypted media content item 149. The media decrypter 138 can be configured to take various actions based upon the identified content type. For example, if the content type of the encrypted media content item 149 is a video, the media decrypter 138 can ensure that after decryption, the unencrypted video remains in a trusted component of the client 106. For example, the media decrypter 138 can deliver the unencrypted video to the video decoder 140 for decoding and playback so that the unencrypted video does not reach an untrusted component of the client.

As another example, if the content type of an encrypted media content item 149 is another type, such as an audio file, the media decrypter 138 can be configured to perform decryption of the encrypted media content item 149 and deliver the unencrypted audio to an untrusted component such as the audio decoder 146 for decoding and playback. In this way, the media decrypter 138 can deliver unencrypted media content items to trusted components 136 and/or untrusted components 144 of the client 106 based upon the content type of the encrypted media content item 149 that is identified by the media decrypter 138.

In order to identify a content type of an encrypted media content item 149, the media decrypter 138 identifies a content type code that is embedded in initialization vectors 132 associated with encrypted samples 131 of an encrypted media content item 149. In other words, for each encrypted sample 131, the media decrypter 138 identifies a corresponding initialization vector 132. The media decrypter 138 can then identify a content type code embedded in the initialization vector (e.g., one or more of the highest ordered bits of the initialization vector). The media decrypter 138 can then decrypt the encrypted media content item 149 by applying a decryption algorithm corresponding to the encryption scheme employed by the media encryption application 119. Decryption of the encrypted media content item 149 is performed by applying the decryption algorithm to each of the encrypted samples 131 and with a corresponding initialization vector 132 and encryption key as inputs to the decryption algorithm.

Because the content type code is embedded within the initialization vector 132 that is generated during the encryption process by the media encryption application 119 and used during the decryption process by the media decrypter 138, an attacker is unable to cause the media decrypter 138 in the client 106 to perform an action with respect to an encrypted media content item 149 corresponding to another content type without causing an invalid result of the decryption process. In other words, in the above example, an attacker would be unable to cause the media decrypter 138 to deliver valid unencrypted media content to an untrusted component 144 of the client 106 by altering the content type code in the initialization vector 132. Doing so would cause the media decrypter 138 to produce a resultant decrypted output that does not correspond to the media content item 123 from which the encrypted media content item 149 was generated because the decryption process relies upon the same bitwise initialization vector 132 to be used as an input to the decryption process that was generated by the media encryption application 119.

Figure 2:
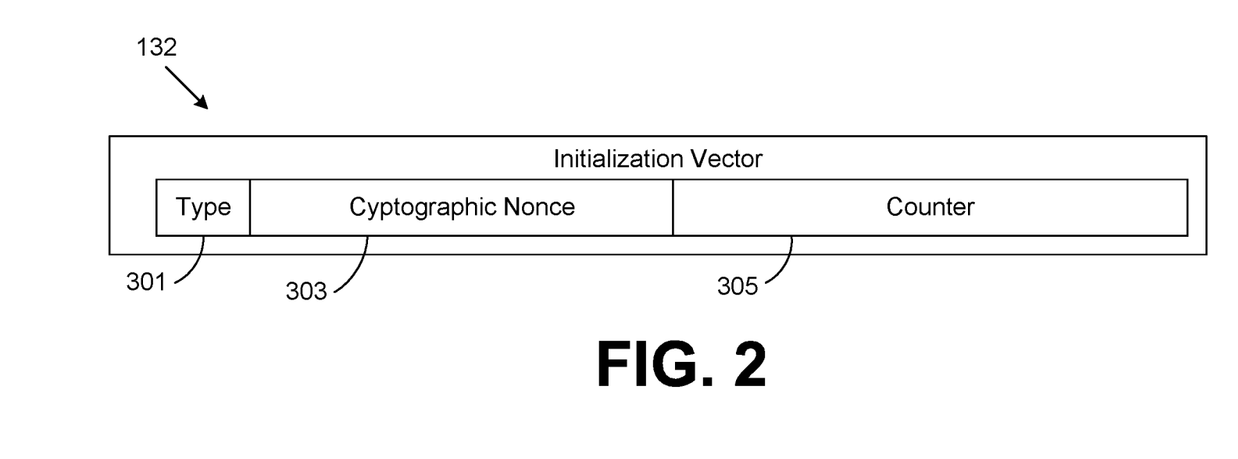
FIGS. 2-3 are drawings illustrating an initialization vector corresponding to an encrypted sample according to various embodiments of the disclosure.

Referring next to FIG. 2, shown is an example of an initialization vector 132 that can be generated by the media encryption application 119 as a part of an encrypted media content item 129 according to various embodiments of the disclosure. As noted above, the media encryption application 119 can encrypt a media content item 123 according to various encryption schemes, such as AES 128 CTR mode, any other block cipher or stream cipher that employs an initialization vector that is packaged along with cipher text produced by the encryption algorithm. In the depicted example, the initialization vector 132 can be packaged along with an encrypted sample 131 in a media container file that supports packaging of encrypted media content. It should be appreciated that in many cases, there are multiple encrypted samples 131 and corresponding initialization vectors 132 corresponding to a single media content item 123 that is encrypted by the media encryption application 119. The size of an encrypted sample 131 often corresponds to a block size specified by the selected encryption scheme, as does the size of the initialization vector 132.

In the depicted example of FIG. 2, the initialization vector 132 includes a content type code corresponding to a content type 127 of the media content item 123. As one example, the content type code can be embedded in the initialization vector 132 in the case of an AES 128 CTR mode encryption scheme. Continuing this example, an encrypted sample 131 that corresponds to the initialization vector 132 is similarly sized to 128 bits. It should be appreciated that in other encryption schemes, the size of the initialization vector 132 and corresponding encrypted sample 131 produced by the media encryption application 119 may vary.

In the example of FIG. 2, the initialization vector 132 corresponds to one that is generated consistent with an encryption scheme such as AES 128 CTR mode or any other encryption scheme where an initialization vector 132 that includes a counter is employed. In the example of FIG. 2, the initialization vector 132 includes a content type code 301 embedded in the two highest order bits of the initialization vector 132. Next, the initialization vector 132 further includes a cryptographic nonce 303 in the next sixty-two highest order bits of the initialization vector 132. In this particular example, AES-128 CTR mode reserves the first sixty-four bits of the initialization vector 132 for use in the decryption process as an input nonce to the decryption process. The remaining sixty-four bits of the initialization vector 132 are a counter value 305 associated with the encrypted sample 131. The counter value 305 allows the media decrypter 138, for example, to determine an ordering of encrypted samples 131 associated with an encrypted media content item 149 relative to other samples and product a properly decrypted result.

It should be appreciated that the size of the content type code 301, cryptographic nonce 303 and/or counter 305 may vary depending upon the number of bits desired in the content type code, the size of a desired cryptographic nonce as well as the size of the counter. It should also be appreciated that in some embodiments, a counter field may not be required for a particular encryption scheme, so the initialization vector 132 may comprise only a content type code and cryptographic nonce.

As is illustrated in the example of FIG. 2, the content type code 301 is embedded in the initialization vector 132 associated with an encrypted sample 131 of an encrypted media content item 149 that can be obtained by an media decrypter 138 of a client 106. Accordingly, the media decrypter 138 can identify the content type from the content type code 301 and take one or more actions in response to detecting a particular content type. As described above, the media decrypter 138 can deliver unencrypted media corresponding to the encrypted media content item 149 to an untrusted component 144 of the client 106 or keep the unencrypted media in a trusted component 136 or within a trusted area of client 106 to reduce the possibility of piracy.

Figure 3:
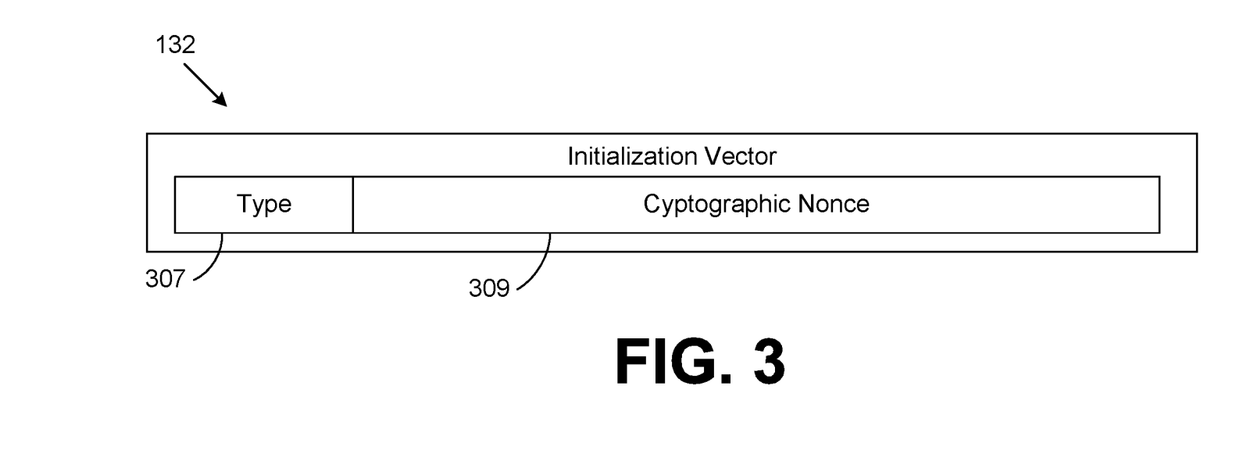

FIG. 3 illustrates an example of an initialization vector 132 that corresponds to one that is generated consistent with an encryption scheme where a counter is not employed. In the example of FIG. 3, the initialization vector 132 includes a content type code 307 embedded in the highest order bit or bits of the initialization vector 132. Next, the initialization vector 132 further includes a cryptographic nonce 309 in the remaining bits of the initialization vector 132. It should be appreciated that the size of the content type code 307 and/or cryptographic nonce 309 may vary depending upon the number of bits desired in the content type code, the size of a desired cryptographic nonce as well as the size of the counter.

Figure 4:
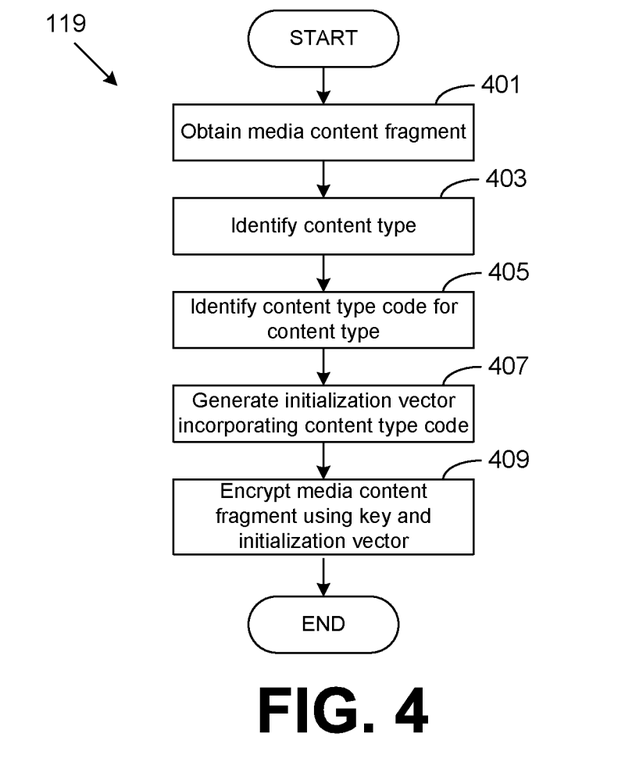
FIG. 4 is a flowchart illustrating example functionality implemented as portions of media encryption application executed in a computing environment in the networked environment of FIG. 1 according to various embodiments of the present disclosure.

Referring next to FIG. 4, shown is a flowchart that provides one example of the operation of an iteration of the media encryption application 119 according to various embodiments. It is understood that the flowchart of FIG. 4 provides merely an example of the many different types of functional arrangements that may be employed to implement the operation of the portion of the media encryption application 119 to encrypt a media content item 123 to generate an encrypted media content item 129. As an alternative, the flowchart of FIG. 4 may be viewed as depicting an example of steps of a method implemented in the computing environment 103 (FIG. 1) according to one or more embodiments.

Beginning with box 401, the media encryption application 119 can obtain a fragment of the media content item 123. The size of the fragment can vary depending upon the block size specified by the encryption scheme selected for use in generating the encrypted media content item 129 corresponding to the media content item 123. In the case of a stream cipher, the fragment can vary depending upon an amount of the media content item 123 being encrypted at any given time by the media encryption application 119.

In box 403, the media encryption application 119 identifies a content type associated with the media content item 123. As noted above, the media encryption application 119 can generate an encrypted media content item 129 corresponding to various content types, such as audio content, video content, electronic book content, or any other type of content. In box 405, the media encryption application 119 identifies a content type code corresponding to the content type of the media content item 123. The media encryption application 119 can be configured to a particular code to a particular content type. For example, if the content type of a media content item 123 corresponds to audio content, the media encryption application 119 can assign a particular bit or series of bits as the content type code. If the content type of a media content item 123 corresponds to video content, the media encryption application 119 can assign a different bit or series of bits as the content type code.

In box 407, the media encryption application 119 generates an initialization vector 132 corresponding to the media content fragment that incorporates the content type code and a cryptographic nonce that is generated by the media encryption application 119. In box 409, the media encryption application 119 encrypts the media content fragment using the initialization vector 132 and an encryption key to generate an encrypted sample 131. The media encryption application 119 can repeat the process shown in FIG. 4 to generate encrypted samples 131 and corresponding initialization vectors 132 for all fragments of a particular media content item 123 (or a desired portion thereof). The encrypted samples 131 and initialization vectors 132 can then be packaged into a media container file as an encrypted media content item 129.

Figure 5:
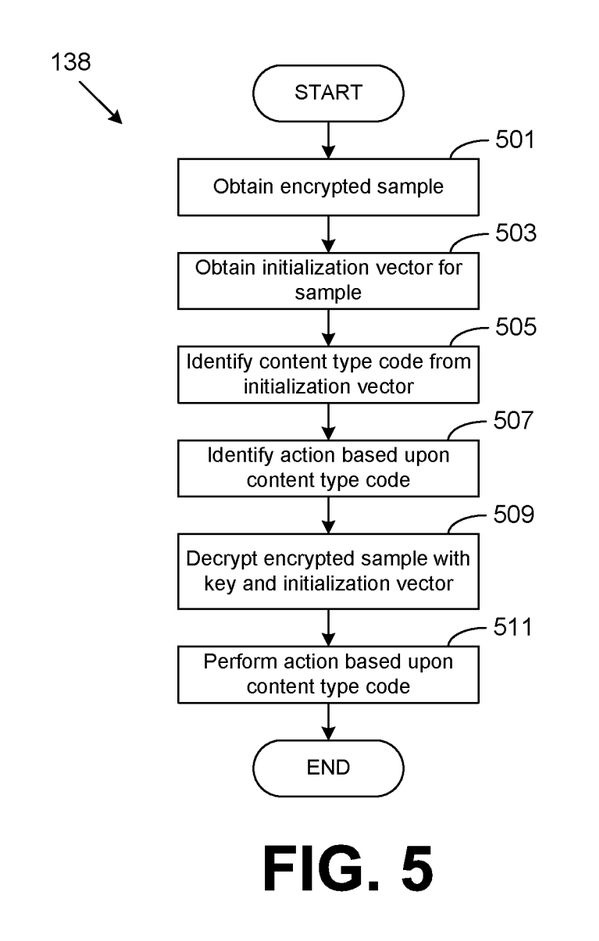
FIGS. 5-6 are flowcharts illustrating example functionality implemented as portions of media decrypter executed in a client in the networked environment of FIG. 1 according to various embodiments of the present disclosure.

Referring next to FIG. 5, shown is a flowchart that provides one example of the operation of an iteration of the media decrypter 138 according to various embodiments. It is understood that the flowchart of FIG. 5 provides merely an example of the many different types of functional arrangements that may be employed to implement the operation of the portion of the media decrypter 138 to decrypt an encrypted sample 131 corresponding to an encrypted media content item 149 obtained from the media delivery application 121 in various embodiments. As an alternative, the flowchart of FIG. 5 may be viewed as depicting an example of steps of a method implemented in the client 106 (FIG. 1) according to one or more embodiments.

First, in box 501, the media decrypter 138 obtains an encrypted sample 131 corresponding to an encrypted media content item 149 obtained from the media delivery application 121. In box 503, the media decrypter 138 obtains the initialization vector 132 corresponding to the encrypted sample 131. In box 505, the media decrypter 138 identifies a content type code in the initialization vector 132. As noted above, the content type code can be embedded in at least one highest order bit of the initialization vector 132.

In box 507, the media decrypter 138 can identify an action associated with the content type. For example, based upon a particular content type (e.g., video), the media decrypter 138 can deliver unencrypted content to only another trusted component 136 of the client 106 for decoding and playback. As another example, for another content type (e.g., audio), the media decrypter 138 can deliver unencrypted content to an untrusted component 144 of the client 106 for decoding and playback. It should be appreciated that the media decrypter 138 can be configured to take any type of actions as well as multiple actions based upon identification of a particular content type, and that the examples referenced above are non-limiting. In box 509, the media decrypter 138 can decrypt the encrypted sample 131 using the initialization vector 132 as well as an encryption key corresponding to the encrypted media content item 149. In box 511, the media decrypter 138 can perform an action corresponding to the content type as identified in box 507.

Figure 6:
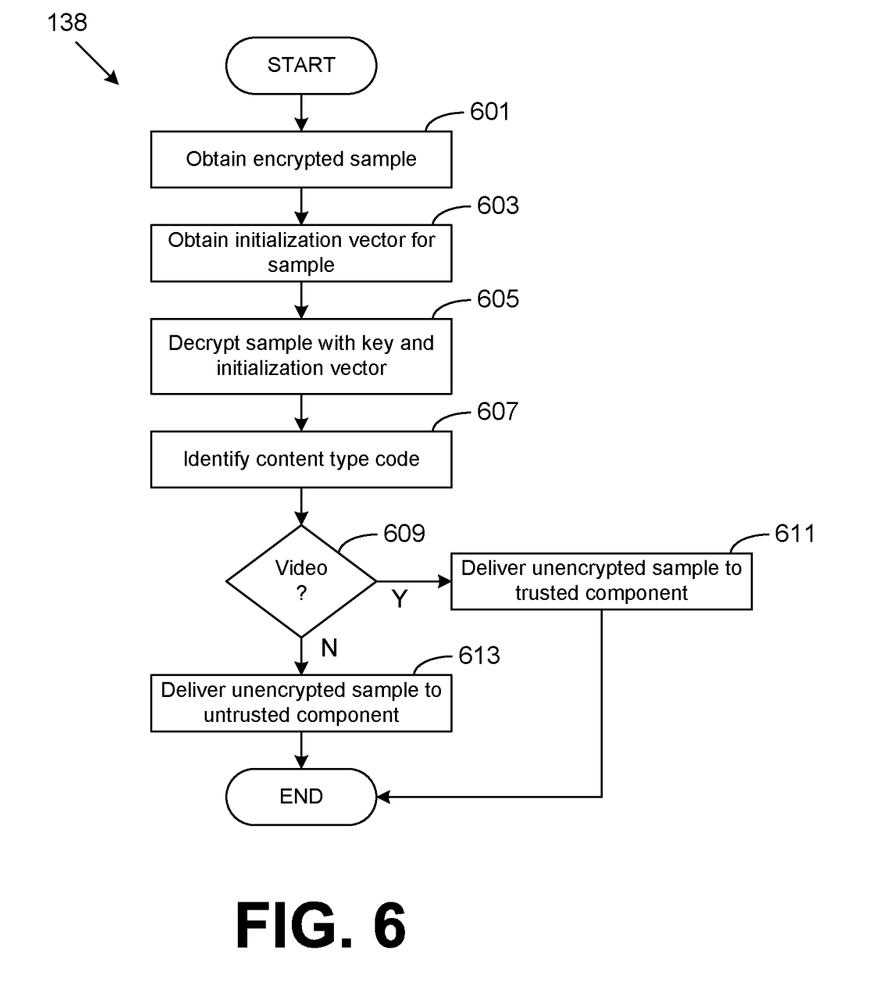

Referring next to FIG. 6, shown is a flowchart that provides an alternative example of the operation of an iteration of the media decrypter 138 according to various embodiments. It is understood that the flowchart of FIG. 6 provides merely an example of the many different types of functional arrangements that may be employed to implement the operation of the portion of the media decrypter 138 to decrypt an encrypted sample 131 corresponding to an encrypted media content item 149 obtained from the media delivery application 121 in various embodiments. As an alternative, the flowchart of FIG. 6 may be viewed as depicting an example of steps of a method implemented in the client 106 (FIG. 1) according to one or more embodiments.

First, in box 601, the media decrypter 138 obtains an encrypted sample 131 corresponding to an encrypted media content item 149 obtained from the media delivery application 121. In box 603, the media decrypter 138 obtains the initialization vector 132 corresponding to the encrypted sample 131. In box 605, the media decrypter 138 decrypts the encrypted sample 131 using the initialization vector 132 and an encryption key. In box 607, the media decrypter 138 determines whether the encrypted sample 131 corresponds to video content that is encrypted as the encrypted media content item 149.

If, in box 609, the media decrypter 138 determines that the encrypted sample corresponds to video content, then the media decrypter 138 delivers the unencrypted sample to a trusted component 136, such as a video decoder 140 that is a trusted component in box 611. In this sense, the video decoder 140 can comprise a hardware video decoder or a software video decoder that is executed within a trusted memory space within the client 106. If, in box 609, the media decrypter 138 determines that the encrypted sample corresponds to non-video content, then the media decrypter 138 delivers the unencrypted sample to an untrusted component 144, such as an audio decoder 146 executed in userspace memory associated with the client 106 in box 613.

Figure 7:
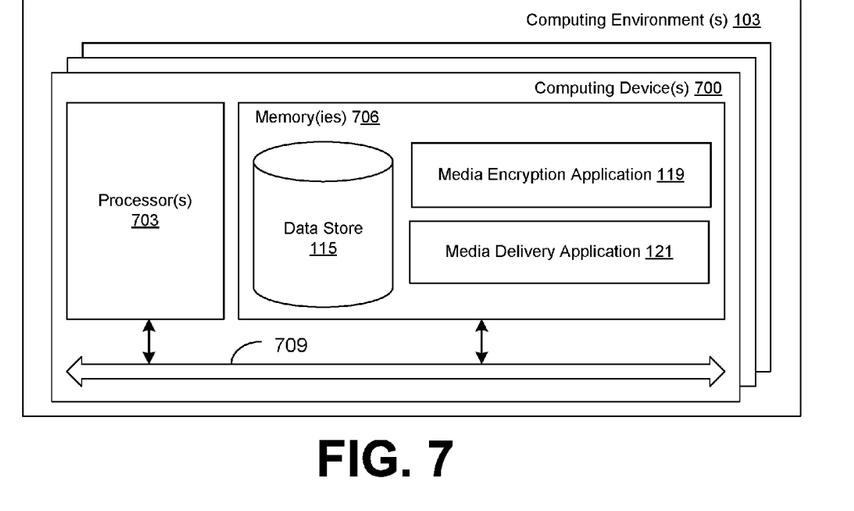
FIGS. 7-8 are schematic block diagram that provide one example illustration of a computing environment and client employed in the networked environment of FIG. 1 according to various embodiments of the present disclosure.

With reference to FIG. 7, shown is a schematic block diagram of the computing environment 103 according to an embodiment of the present disclosure. The computing environment 103 includes one or more computing devices 700. The computing device 700 includes at least one processor circuit, for example, having a processor 703 and a memory 706, both of which are coupled to a local interface 709. To this end, the computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are media encryption application 119, the media delivery application, and potentially other applications. Also stored in the memory 706 may be a data store 115 and other data. In addition, an operating system may be stored in the memory 706 and executable by the processor 703.

It is understood that there may be other applications that are stored in the memory 706 and are executable by the processors 703 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and the memory 706 may represent multiple memories 706 that operate in parallel processing circuits, respectively. In such a case, the local interface 709 may be an appropriate network 112 (FIG. 1) that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Figure 8:
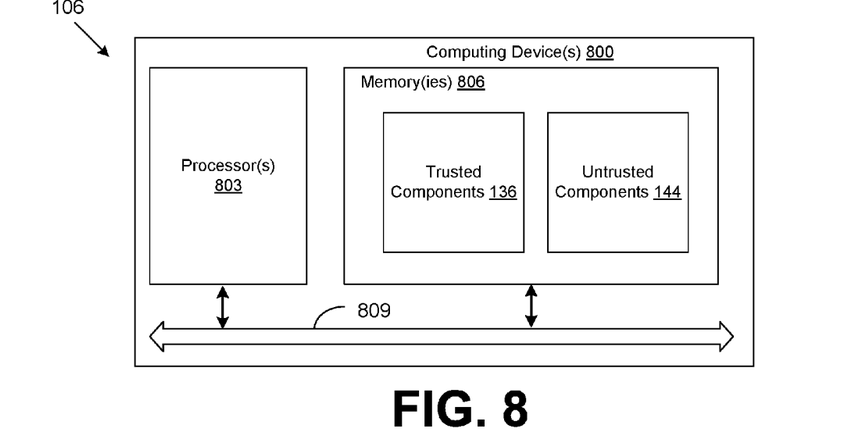

With reference to FIG. 8, shown is a client 106 according to various embodiments. The client 106 comprises a computing device that includes at least one processor circuit, for example, having a processor 803 and a memory 806, both of which are coupled to a local interface 809 and similarly configured as the computing device shown in FIG. 7. The client 106 can also include trusted components 136, where components such as a media decrypter 138 or other components can be executed or reside. Additionally, the client 106 can also include untrusted components 144 where components such as an audio decoder 146 or other components can be executed or reside. It should be appreciated that the media decrypter 138, the video decoder 140, and/or audio decoder 146 can be implemented as hardware components that are in communication with the local interface 809 as well as software executed by the processor 803 and that the depicted embodiment shown in FIG. 8 is but one example.

It should also be appreciated that the client 106 can be implemented with various trust zones in which software and/or hardware components can be logically arranged by an operating system or other software and hardware components in the client 106. In this sense, the client 106 can be implemented with mechanisms through trust can be established between various components in the client 106, whether these components are implemented in hardware or software, and a media decrypter can be implemented to route and/or deliver decrypted content to any of these trust zones depending upon the content type code embedded in an initialization vector according to an embodiment of the present disclosure. For example, as noted above, a first trust zone can include a hardware decrypter in a computing system in which content is decrypted as well as a video card or trusted code executed by the computing system in which video decoding occurs if the content type specifies that the encrypted content is video content. A second trust zone can include untrusted code executed by the computing system in which decoding of audio content occurs if the content type specifies that the encrypted content is audio content.

Although the media encryption application 119 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 4-6 show the functionality and operation of an implementation of portions of the media encryption application 119 and media decrypter 138. If embodied in software, firmware, and/or digital circuitry, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 4-6 show a specific order of execution, it is understood that the order of execution may differ from that which is depicted. For example, the order of execution of two or more blocks may be scrambled relative to the order shown. Also, two or more blocks shown in succession in FIGS. 4-6 may be executed concurrently or with partial concurrence. Further, in some embodiments, one or more of the blocks shown in FIGS. 4-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the media encryption application 119 and media decrypter 138, that comprises software, firmware, digital logic, or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a computing device; and
   a media decrypter executable in the computing device, the media decrypter, when executed, causing the computing device to at least:
   obtain an encrypted media content item;
   identify an initialization vector associated with the encrypted media content item;
   identify a content type associated with the encrypted media content item based upon the initialization vector;
   decrypt the encrypted media content item based at least in part upon the initialization vector and an encryption key, wherein the initialization vector comprises at least one bit specifying the content type and a cryptographic nonce; and
   perform an action associated with the decrypted media content item based at least in part upon the content type.

2. The system of claim 1, wherein the content type associated with the encrypted media content item is identified based upon a content type code embedded within the initialization vector.

3. The system of claim 2, wherein the content type code specifies that the encrypted media content item is at least one of: a video sample or an audio sample.

4. The system of claim 2, wherein the content type code comprises at least one highest order bit of the initialization vector.

5. The system of claim 2, wherein the media decrypter decrypts the encrypted media content item by applying an advanced encryption standard encryption (AES) algorithm to the encrypted media content item, wherein the AES encryption algorithm is applied in a counter mode.

6. The system of claim 5, wherein the initialization vector further comprises a counter value.

7. The system of claim 5, wherein the initialization vector comprises the content type code assigned to the two highest order bits of the initialization vector, the cryptographic nonce assigned to the next highest order bits of the initialization vector, and the counter assigned to the last highest order bits of the initialization vector.

8. The system of claim 1, wherein the encrypted media content item is packaged into a media container.

9. A method comprising:
- obtaining, in a computing device, an encrypted media content item;
- identifying, in the computing device, an initialization vector associated with the encrypted media content item, wherein the initialization vector comprises at least one bit specifying a content type and a cryptographic nonce;
- identifying, in the computing device, the content type associated with the encrypted media content item based upon the initialization vector;
- decrypting, in the computing device, the encrypted media content item based at least in part upon the initialization vector and an encryption key; and
- performing, in the computing device, an action associated with the decrypted media content item based at least in part upon the content type.

10. The method of claim 9, wherein identifying the content type associated with the encrypted media content item further comprises identifying a content type code corresponding to the content type in the initialization vector.

11. The method of claim 10, wherein the content type code comprises at least one highest order bit of the initialization vector.

12. The method of claim 9, wherein the initialization vector further comprises a counter.

13. The method of claim 12, wherein the initialization vector comprises a content type code assigned to the two highest order bits of the initialization vector, the cryptographic nonce assigned to the next highest order bits of the initialization vector after the two highest order bits, and the counter assigned to the lowest order bits of the initialization vector.

14. The method of claim 9, wherein performing the action associated with the decrypted media content item based at least in part upon the content type further comprises delivering, in the computing device, the decrypted media content item to a first trust zone when the content type corresponds to a first content type.

15. The method of claim 14, wherein performing the action associated with the decrypted media content item based at least in part upon the content type further comprises delivering, in the computing device, the decrypted media content item to a second trust zone when the content type corresponds to a second content type.

16. The method of claim 15, wherein decrypting the encrypted media content item is performed in the second trust zone.

17. The method of claim 9, wherein decrypting the encrypted media content item based at least in part upon the initialization vector and the encryption key further comprises applying, in the computing device, an advanced encryption standard (AES) decryption algorithm to the encrypted media content item.

18. A non-transitory computer-readable medium embodying a program executable in a computing device, the program causing the computing device to at least:
- obtain an encrypted media content item;
- extract an initialization vector associated with the encrypted media content item, wherein the initialization vector further comprises at least one bit specifying a content type and a cryptographic nonce;
- determine whether the content type associated with the encrypted media content item corresponds to video content, the content type being embedded as a content type code in the initialization vector;
- decrypt the encrypted media content item based at least in part upon the initialization vector and an encryption key;
- deliver an unencrypted media content item corresponding to the encrypted media content item to a trusted video decoder executed in the computing device when the content type corresponds to video content; and
- deliver the unencrypted media content item to an audio decoder executed in the computing device when the content type corresponds to audio content.

* * * * *